A. COLTON & B. W. SCOTT.
MOLDING MACHINE.
APPLICATION FILED JAN. 30, 1914.

1,111,879.

Patented Sept. 29, 1914.
5 SHEETS—SHEET 1.

WITNESSES:
L. S. Woodhull
L. M. Spencer

Inventors
Arthur Colton and
Burton W. Scott.
BY Edward N. Pagelsen,
ATTORNEY

A. COLTON & B. W. SCOTT.
MOLDING MACHINE.
APPLICATION FILED JAN. 30, 1914.

1,111,879.

Patented Sept. 29, 1914.
5 SHEETS—SHEET 2.

WITNESSES:
L. S. Woodhull
L. M. Spencer

Inventors
Arthur Colton and
Burton W. Scott
BY
Edward A. Pagelsen.
ATTORNEY

A. COLTON & B. W. SCOTT.
MOLDING MACHINE.
APPLICATION FILED JAN. 30, 1914.

1,111,879.

Patented Sept. 29, 1914.
5 SHEETS—SHEET 3.

A. COLTON & B. W. SCOTT.
MOLDING MACHINE.
APPLICATION FILED JAN. 30, 1914.

1,111,879.

Patented Sept. 29, 1914.
5 SHEETS—SHEET 4.

WITNESSES:
L. S. Woodhull
L. M. Spencer

Inventors
Arthur Colton and
Burton W. Scott.
BY Edward N. Pagelsen,
ATTORNEY

A. COLTON & B. W. SCOTT.
MOLDING MACHINE.
APPLICATION FILED JAN. 30, 1914.
1,111,879.
Patented Sept. 29, 1914.
5 SHEETS—SHEET 5.
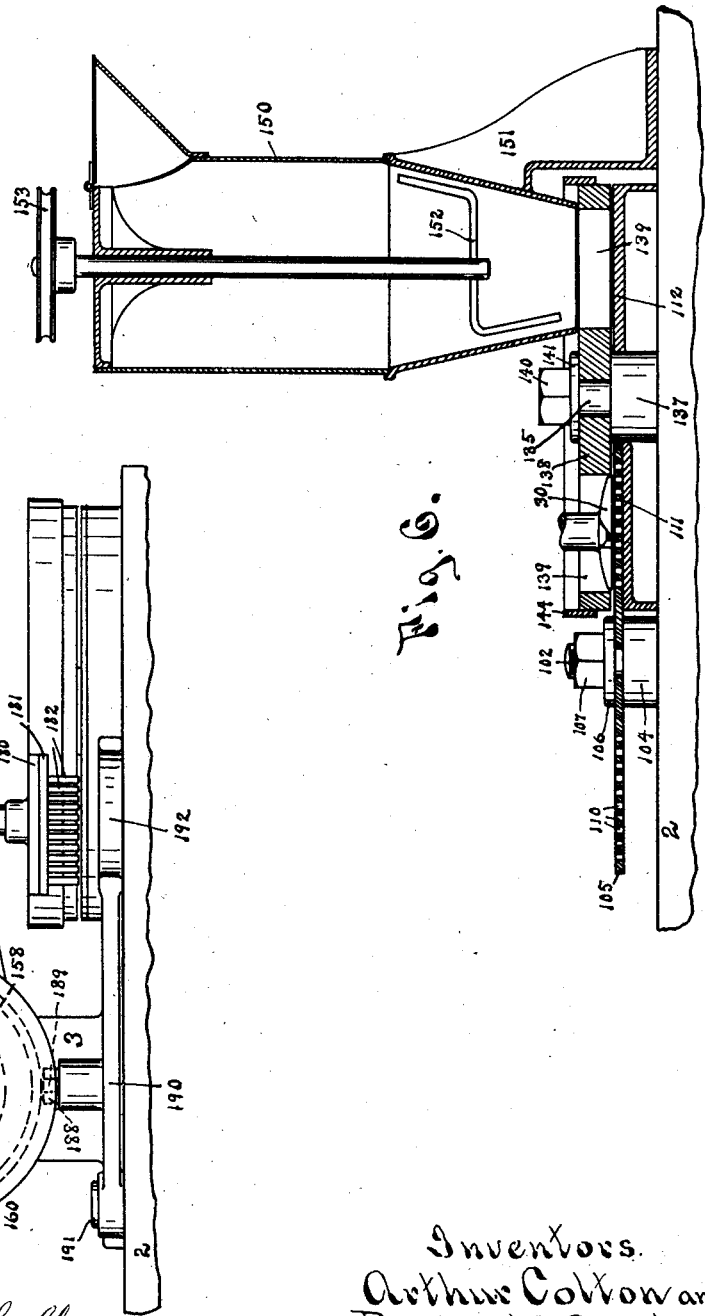
WITNESSES:
L. S. Woodhull
L. M. Spencer
Inventors.
Arthur Colton and
Burton W. Scott.
BY
Edward N. Pagelsen.
ATTORNEY

UNITED STATES PATENT OFFICE.

ARTHUR COLTON AND BURTON W. SCOTT, OF DETROIT, MICHIGAN, ASSIGNORS TO ARTHUR COLTON COMPANY, OF DETROIT, MICHIGAN, A CORPORATION OF MICHIGAN.

MOLDING-MACHINE.

1,111,879.  Specification of Letters Patent.  Patented Sept. 29, 1914.

Application filed January 30, 1914. Serial No. 815,376.

*To all whom it may concern:*

Be it known that we, ARTHUR COLTON and BURTON W. SCOTT, citizens of the United States, and residents of Detroit, in the county of Wayne and State of Michigan, have invented a new and Improved Molding-Machine, of which the following is a specification.

This invention relates to machines for forming medicinal tablets and its object is to provide means for automatically filling the apertures in a mold plate with a medicinal mass, and then removing the finished tablets, which means shall be simple in construction, rapid in operation, and entirely automatic.

This invention consists in a mold plate provided with a series of groups of apertures, each aperture of the exact size of the desired tablet, a chamber for the material to be formed into tablets, a movable carrier, a device for compacting the material into the apertures to form tablets, means for removing the tablets from the apertures, and actuating mechanism to move the chamber from the container to the compacting device and move the mold plate with its apertures below the chamber so that they may be filled, then move the mold plate until the filled apertures are in proper position relative to the removing device and then actuate the latter.

Figure 1:
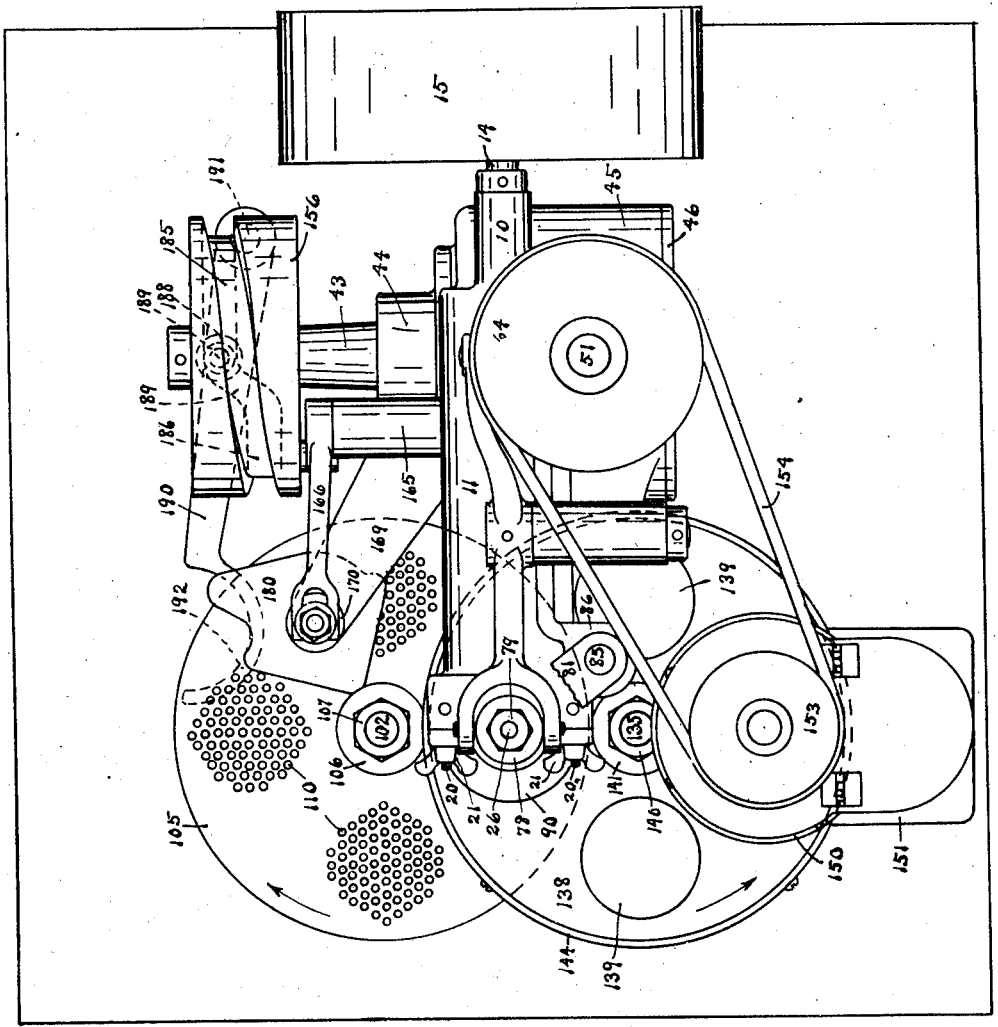
Figure 2:
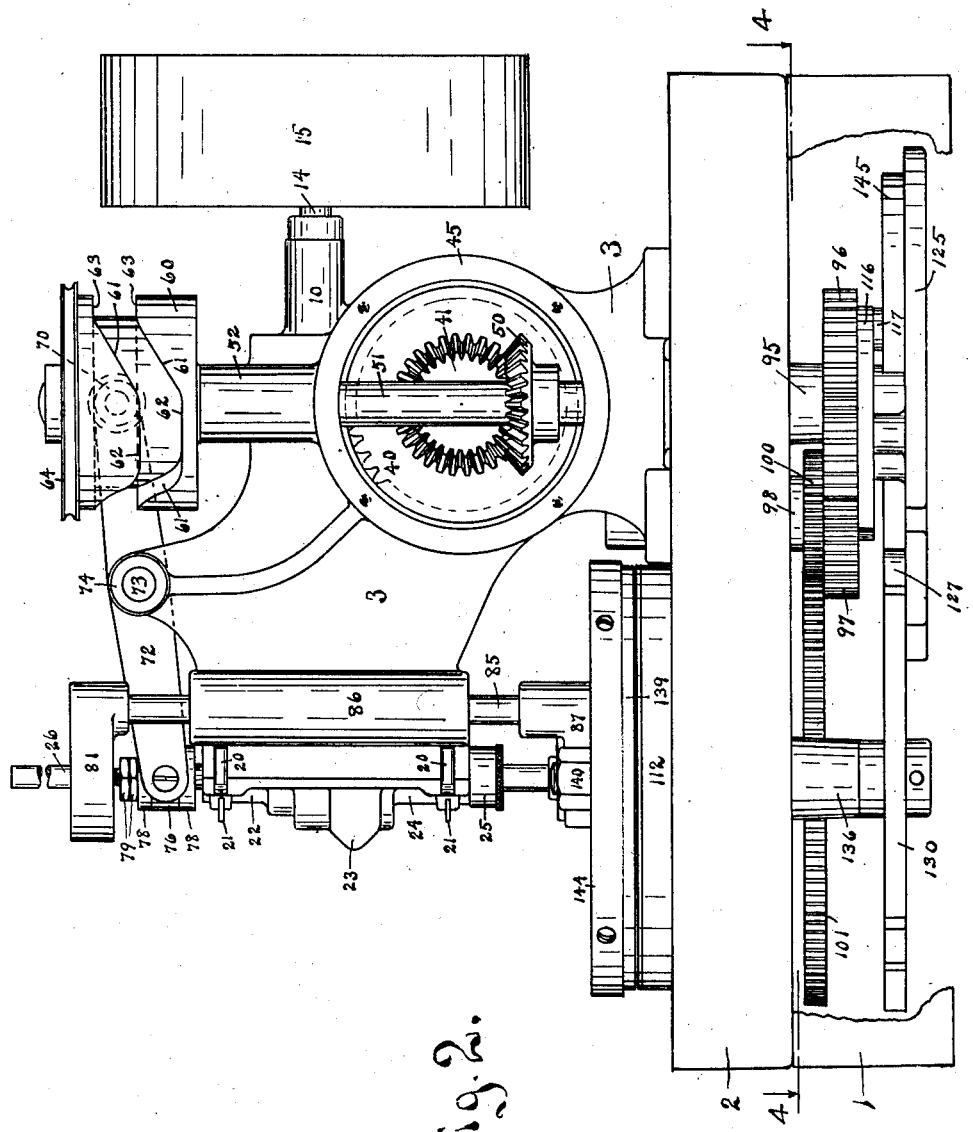
Figure 3:
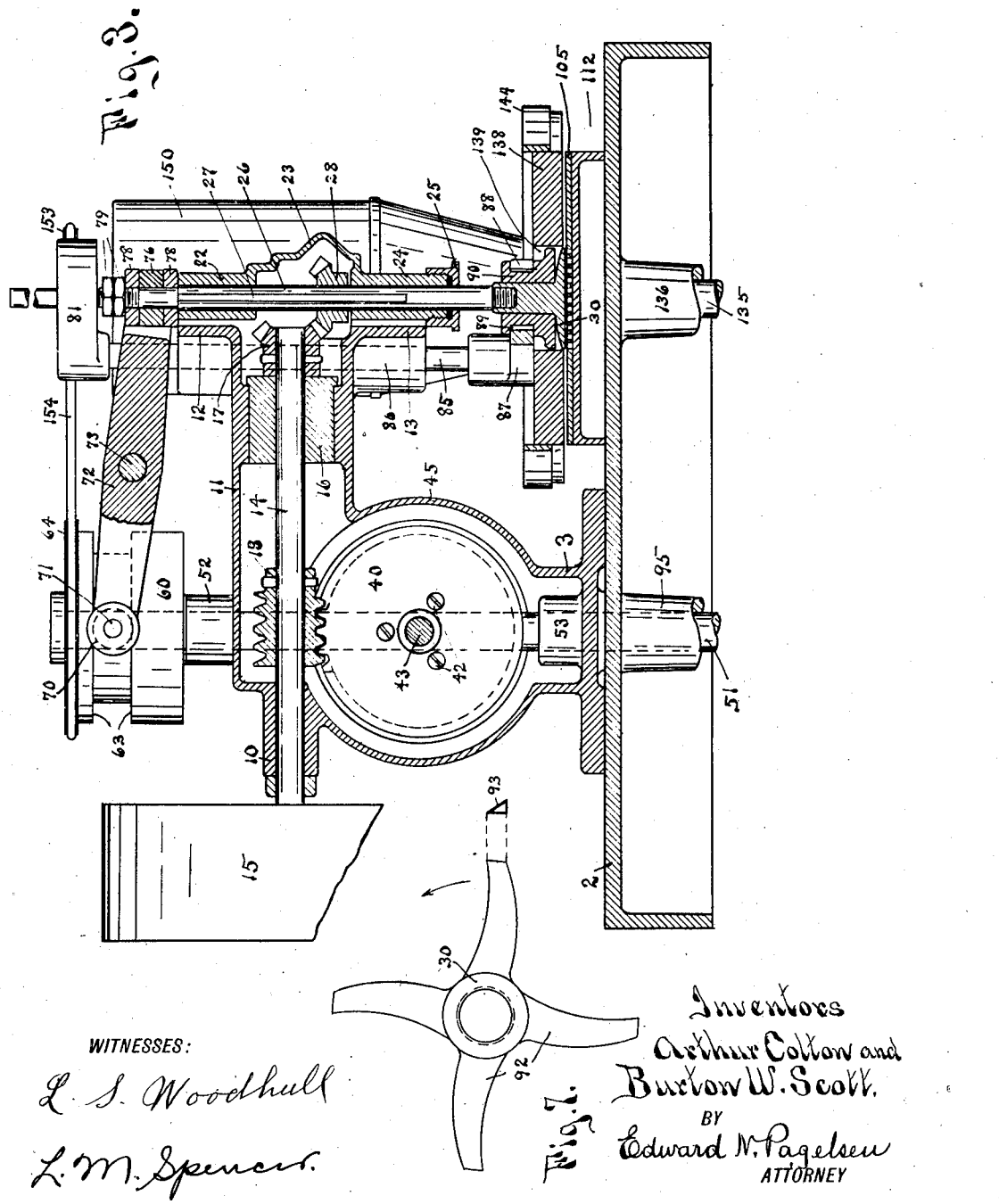
Figure 4:
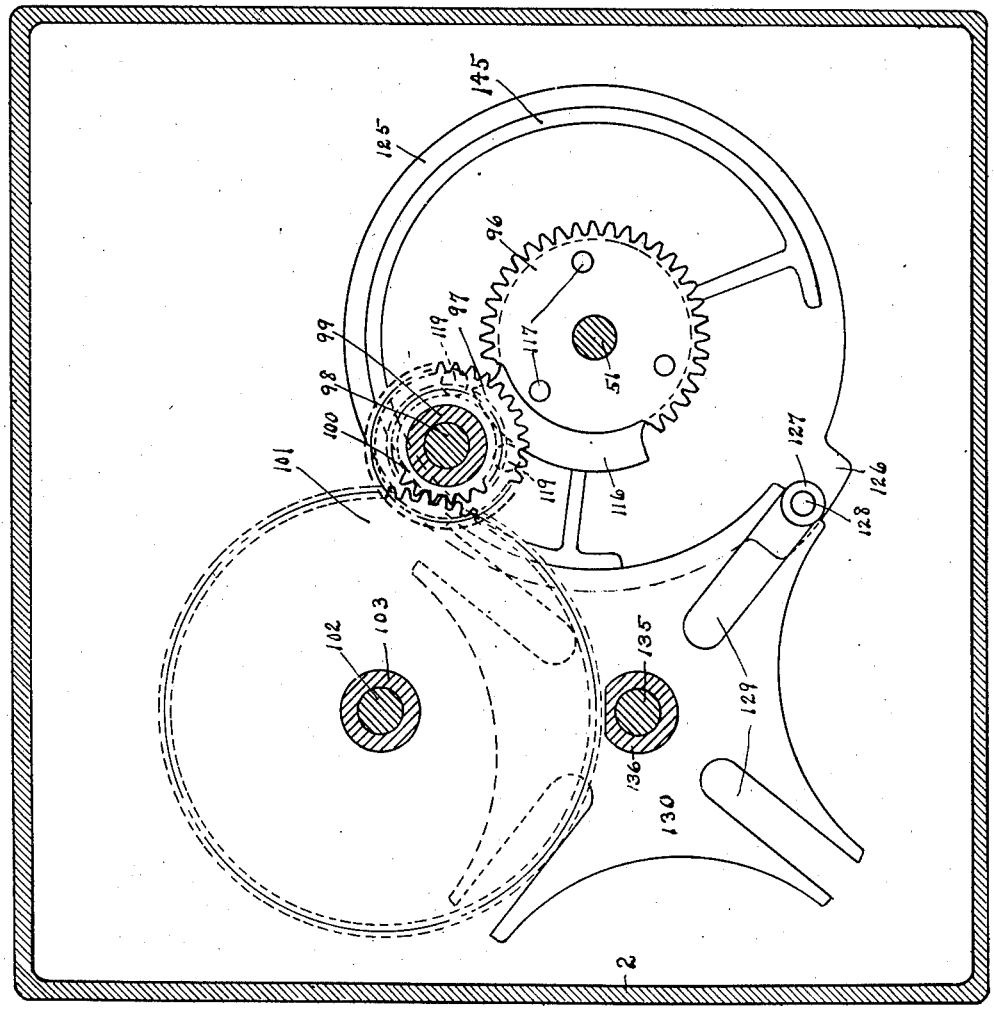

In the drawings, Figure 1 is a plan of the machine, certain of the parts being broken away for the sake of clearness. Fig. 2 is a side elevation, portions of the base, together with the hopper and the face of the gear casing, being removed for the sake of clearness. Fig. 3 is a vertical section on the line 3—3 of Fig. 1, looking in the direction indicated by the arrows. Fig. 4 is a horizontal section on the line 4—4 of Fig. 2. Fig. 5 is a fragmentary side elevation showing the punch operating mechanism and the mechanism for removing the tablets from beneath the mold plate. Fig. 6 is a fragmentary vertical section showing the relation of the hopper, the rotary table, the mold plate and the wiper. Fig. 7 is a plan view of the wiper.

Similar reference characters refer to like parts throughout the several views.

In the drawings, 1 indicates a detachable base upon which the main base plate 2, that supports the moving parts, may be mounted, and seated upon the base plate 2 is a frame 3, the details of which will be hereinafter described.

The frame (Fig. 3) may have formed therein a bearing 10 and a tubular extension 11, that may be provided with an upwardly extending flange 12 and a downwardly depending flange 13. The driving shaft 14, having the driving pulley 15 rigidly secured thereon, may be rotatably supported at one end in the bearing 10, and at its other end in a sleeve 16 carried in the tubular extension 11, and may have rigidly secured thereto the worm gear 18 and the bevel gear 17. Secured to the flanges 12 and 13 in any desired manner, such as by means of the bolt 20 and thumb-nuts 21, (Figs. 1 and 2) is a member that comprises an upper bearing 22, a gear casing 23, and a lower bearing 24, the latter being preferably provided with the gland 25 attached to its lower end to prevent lubricants from escaping. Mounted to reciprocate in the bearings is a rotatable shaft 26 that is connected by a spline 27 to slide in but rotate with the bevel gear 28, the latter meshing with the bevel gear 17. The shaft 26 has secured to its lower end a wiper 30.

The worm 18 engages with and rotates the worm-wheel 40, (Figs. 2 and 3), to which a bevel gear face 41 may be secured by means of the screws 42, the worm-wheel and gear face being mounted on the horizontal shaft 43 that turns in a bearing 44 formed on the side of a gear casing 45, access to the interior of which may be had by means of the cover-plate 46 (Fig. 1), which plate is omitted in Fig 2. Engaging with the bevel gear face 41 is a bevel gear 50, rigidly secured to a vertical shaft 51 that is mounted to turn in the upper bearing 52 and the lower boss 53 (Fig. 3) on the frame 3. To the upper end of the shaft 51 is rigidly secured a cam 60, having a groove therein that comprises the inclined portions 61, the ends of which are connected by the lower horizontal portion 62 and the upper horizontal portion 63. The upper end of the shaft also has rigidly secured thereto the pulley 64, the purpose of which will be hereinafter indicated.

Running in the groove in the cam 60 is a roller 70 that is mounted on a pin 71 carried by one end of a lever 72, which may be rigidly secured to a shaft 73 that turns in the bearing 74 formed on the frame 3. The other end of the lever is bifurcated and carries a collar 76 that is mounted on the reduced upper portion of the shaft 26 between washers 78, positioned by the set-nuts 79. The shaft 26 is extended upwardly above the nuts 79 to constitute a guide and support for the weight 81 that may rotate and slide longitudinally thereon. Secured to the weight 81 is a vertical rod 85, that may slide in the bearing 86 formed on the frame, and rigidly attached to the lower end of the rod is a presser yoke 87, the divided laterally extending end 88 of which is received in a groove 89 in a presser foot 90 that is slidably and may also be rotatably mounted on the wiper 30.

It will be seen that rotation of the cam 60 will swing the lever 72 about its pivot and cause a reciprocation of the shaft 26, and that the wiper 30, weight 81, rod 85, yoke 87, and the presser foot 90, will be elevated on one stroke and lowered on the next. It will also be noticed, that, whereas the parts mentioned are all positively elevated, and the shaft 26 and wiper 30 are positively lowered, the weight 81, rod 85, and the presesr foot 90 are merely lowered by the action of gravity, inasmuch as the weight 81 is slidable upon the upper portion of the shaft 26.

The wiper 30 may be attached to the shaft 26 by the screw-joint, and comprises a series of radially extending arms 92, having beveled or inclined sides 93, the upper edge of each of which is at the forward side of the respective arm, as regards the normal angular motion of the shaft 26 (shown by the arrow in Fig. 7).

The frame 3 is provided with a downwardly depending boss 95 that is in alinement with the boss 53 and passes through an opening in the main base-plate 2, to afford a further bearing for the shaft 51, which extends through the boss 95 and has secured to its lower end a mutilated gear 96 (Fig. 4). This gear engages with and intermittently rotates the gear 97 that turns upon the shaft 98, mounted in a boss 99 formed on the main base plate. A second gear 100 is mounted on the same shaft to rotate with the gear 97, and drives the third gear 101 that is rigidly connected to a shaft 102, mounted to turn in the boss 103 which is formed on the main base plate 52. The shaft 102 extends upwardly through the base plate and has rigidly secured thereto above the plate, a collar 104, (Fig. 6) to the upper face of which a rotatable disk-shaped mold-plate 105 may be clamped by means of the washer 106 and the nut 107 on the upper end of the shaft 102. This mold plate is provided with a series of groups of perforations 110, and turns in an arc-shaped depression 111 formed in the table 112 that rests upon the main base plate.

The mold plate is prevented from rotating in either direction, during the time that the teeth of the mutilated gear 96 are out of engagement with the teeth of the gear 97, by a stop-plate 116 secured to the lower side of the gear 96 by the pins 117, with which plate two pins 119, that project downwardly from the face of the gear 97, are adapted to engage.

Material is fed to the mold plate by mechanism that will now be described: To the lower end of the shaft 51 is fixed a rotary plate 125 (Figs. 2 and 4) that may be provided with a lateral projection 126, upon the upper face of which a roller 127 may be mounted to turn on the pin 128, this roller being adapted to engage in any one of the series of slots 129 formed in the Geneva wheel 130. The wheel 130 is rigidly connected to a shaft 135 that passes through the boss 136 which projects from the lower face of the base plate 2, the shaft having fixed thereto at a point just above the base plate the collar 137 (Fig. 6), to the upper face of which the rotary feed-plate 138, having a series of cylindrical chambers 139 therein, may be clamped by the nut 140 and washer 141. The inner diameter of each of the chambers 139 is slightly greater than the exterior diameter of the wiper 30.

The feed-plate is prevented from rotating in either direction, during the time that the roller 127 is out of engagement with any of the slots 129, by a circular locking arc 145 on the upper face of the plate 125 in the manner usually found in Geneva movements. The chambers 139 in the Geneva wheel are supplied with material from the hopper 150 that may be mounted in a bracket 151, the hopper preferably being provided with an agitator 152 that is kept in motion by a pulley 153, driven from the pulley 64, heretofore referred to, by means of the belt 154.

Assuming that material has been forced into the openings in the mold plate, it is removed therefrom by the following mechanism: Upon the outer end of the shaft 43 (Figs. 1 and 5) is rigidly secured a rotary cam 156 that has formed in its inner face a cam-groove shown in dotted lines in Fig. 5, and comprising an outer circular portion 158, an inner circular portion 159, and connecting portions 160. Running in this cam-groove is a roller 162 that may turn upon a pin 163, carried by one end 164 of a bell-crank that is mounted on a pin pivoted in a hub 165 formed on the casing 2. The outer end 166 of the bell-crank is divided to form bifurcations, the end of each of which is provided with a rounded enlargement 167. Loosely held between the enlargements by means of the washers 173 and 174 and the nut 175, is the threaded reduced end 172 of a punch shaft 171, that is slidable vertically in the bearing 170 and is prevented from turning angularly in respect thereto by the key 176 and slot 177 in an obvious manner. The lower end of the shaft 171 has attached thereto a plate 180 to which a punch-head 181, carrying the punches 182, is secured in any desired way. The punches correspond in size and relative location to the groups of openings in the mold plate; and it will be seen that they are given an upward stroke and a downward stroke at each rotation of the cam 156. The cam 156 also has formed in its outer cylindrical surface a groove comprising an inclined portion 185, a portion 186, at right angles to the axis of the cam, and a connecting portion 187. Running in this groove is a roller 188 that may turn on a pin 189 carried by the discharge arm 190 which is pivoted to the base-plate 2 at 191. The outer end of the arm may be curved, as indicated at 192, and is positioned beneath the mold plate 105. It is apparent that the discharge arm is swung back and forth beneath the mold plate at each rotation of the cam 156, and that its motion may be so timed, in respect to the movement of the punches, as to remove the finished articles from beneath the mold plate.

A band or rim 144 may be secured to the circumference of the chambered feed-plate 138 to prevent the material from the container 150 from spilling over the edge.

This device is especially adapted for forming medicinal tablets from loose powdered materials, preferably moistened with alcohol or other volatile liquids to form a plastic mass. The plastic substance is placed in the container and kept stirred, and as the chambers 139 come under the lower end of the container, these chambers are filled. The wiper 30, by means of its arms, wipes or "pastes" the plastic mass into the openings or apertures 110 in the mold plate in such a manner that the tablet will be very compact, and when the liquid has evaporated, the tablets will be of any desired hardness, especially as the downward force of the presser foot 90 can be varied.

Operation: It is evident that when one of the chambers 139 in the feed-plate 138 is in the position shown in Fig. 6, it will be filled with material from the receptacle 150. During the time the filling is taking place, the feed table is prevented from turning by the Geneva wheel 130 and the locking arc 145. As the plate 125 continues to turn the locking arc 145 passes out of engagement with the Geneva wheel 130 and permits the roller 127 to turn the wheel 130 one step. The stem 60 is so set in respect to the shaft 43 as to cause the lever 72-75 to elevate the constantly rotating shaft 26, the wiper 30, and the presser foot 90 just before the feed-plate begins to turn, and to hold these parts above the feed-plate until it again becomes stationary. As soon as the feed-plate has ceased to revolve, the cam 60 positively lowers the shaft 26 and the wiper 30 into the chamber 139, which has been previously filled and which was brought into axial alinement with the shaft 26 by the partial rotation of the feed-plate just described. At the same time the weight 81 and rod 85 together with the weight of the presser foot 90, cause the latter to press upon the upper surface of the plastic material in the chamber and feed it to the rotating wiper 30. At about the instant that the wiper enters the chamber 139, the teeth on the mutilated gear 96 come into engagement with the teeth on the gear 97, thereby turning the gear 101, the shaft 102 and the mold plate 105 rather slowly in the direction indicated by the arrow in Fig. 1. As the openings 110 in the moving mold plate pass beneath the wiper, the forwardly inclined lower surfaces 93 of the arms 92 contact with the material and force it downwardly, packing it tightly into the said openings, and the lower edge of the arms trims the upper face of the material to the plane of the upper surface of the mold plate. When the teeth on the mutilated gear 96 pass out of engagement with the teeth on the gear 97, the pins 119 and 120 come into contact with the lock-plate 116, thereby holding the mold plate stationary. Shortly thereafter the roller 162, that has been traveling in the circular portion 158 of the groove in the cam 156, passes into the inclined portion 160 and turns the bell-crank about its axis, depressing the punch and pushing the previously molded articles out of the openings in the mold plate. At the end of the punching stroke, the roller travels for a short time in the circular portion 159 of the groove, then up the other inclined portion 160 and into the circular portion 158 to elevate the punch and retain it in elevated position. The groove in the outer face of the sam 156 is so located angularly of the cam as to cause the discharge arm 190 to be positioned at its inner limit of movement in respect to the mold plate, when the punch plate descends. Shortly afterward the inclined portion 187 of the groove comes into contact with the roller and swings the arm 190 outwardly about the pivot 191, thereby removing the molded articles from beneath the mold plate, after which the arm is returned by the inclined portion 185 of the groove. The parts 159 and 160 of the cam pass the roller 162 while the mold plate is at rest. The arm 190 may be actuated at any time after the punches have been lifted.

It is obvious that many changes may be made in the construction of the mechanism without departing from the spirit of our invention; for example, the number of feed chambers in the feed-plate and the number of groups of perforations in the mold plate may be varied.

Having described our invention, what we desire to secure by Letters Patent is:—

1. In a molding machine, a movable feed plate having a chamber therein, a movable mold plate having an apertured portion that passes beneath said chamber, a table beneath the mold plate and in close engagement with the lower surface thereof, a rotary member, and means for projecting the rotary member into the chamber to force material contained therein into the aperture in the mold plate.

2. In a molding machine, a movable feed plate having a chamber therein, a movable mold plate having an apertured portion that passes beneath said chamber, a table beneath the mold plate and in close engagement with the lower surface thereof, a rotary member, means for projecting the rotary member into the chamber to force material contained therein into the aperture in the mold plate, and means for moving the mold plate while the rotary member is projected into the chamber.

3. In a molding machine, a movable feed plate having a chamber therein, a movable mold plate having an apertured portion that passes beneath said chamber, a table beneath the mold plate and in close engagement with the lower surface thereof, a movable member adapted to agitate the material, means for moving the movable member in one direction to project it into the chamber, means for moving a portion of the member in another direction while in the chamber, to force the material contained therein into the aperture in the mold plate, and means for moving the mold plate while the member is in the chamber.

4. In a molding machine, a movable feed plate having a chamber therein, a movable mold plate having an apertured portion that passes beneath said chamber, a table beneath the mold plate and in close engagement with the lower surface thereof, a rotary member, means for projecting the rotary member into the chamber to force material contained therein into the aperture in the mold plate, and means for feeding material in the chamber to the rotary member.

5. In a molding machine, a rotary feed plate having a chamber therein, a rotary mold plate having a portion provided with apertures that pass beneath the chamber, a table beneath the mold plate and in close engagement with the lower surface thereof, a rotary wiper, means for projecting the wiper into the chamber, and means for rotating the wiper when in the chamber to force material into the apertures in the mold plate.

6. In a molding machine, a movable member having a chamber therein, a movable mold plate having an apertured portion beneath the chamber, a table beneath the mold plate and in close engagement with the lower face thereof, a rotary member, means for projecting said rotary member into the chamber, said member comprising a forwardly inclined face that serves to force material contained in the chamber into the aperture in the mold plate.

7. In a molding machine, a movable member having a chamber therein, a movable mold plate having a portion provided with openings that pass beneath the chamber, a table beneath the mold plate and in close engagement with the lower face thereof, a rotary member in the chamber, said member constructed to force material in the chamber into the openings in the mold plate, and means for moving the mold plate while the member is forcing material into the openings therein.

8. In a molding machine, a rotary feed plate having a chamber therein, a rotary mold plate having a portion provided with apertures that pass beneath the chamber, a fixed table beneath the mold plate and in close engagement with the lower surface thereof, a movable member the rear edge of which lies in close proximity to the face of the mold plate, means for projecting the member into the chamber from above, means for moving the member while in the chamber, a second member adapted to be projected into the chamber behind the first mentioned member to feed material to the latter, and means for moving the mold plate while the members are in the chamber.

9. In a molding machine, a member having a chamber therein, a movable mold plate having a portion provided with an opening that passes beneath the chamber, a table beneath the mold plate and in close engagement with the lower surface thereof, a movable member in the chamber having a forwardly inclined face, means for moving the last mentioned member, and a second movable member in the chamber, said second movable member being movable longitudinally of the chamber in respect to the member having the forwardly inclined face and serving to feed material thereto and the latter serving to force the material into the opening in the mold plate.

10. In a molding machine, a member having a chamber therein, a movable mold plate having a portion provided with an opening that passes beneath the chamber, a table beneath the mold plate and in close engagement with the lower surface thereof, a movable member in the chamber, means for moving the last mentioned member, a second movable member in the chamber, said second movable member being movable longitudinally of the chamber in respect to the first mentioned movable member in the chamber, said member serving to feed material to the first mentioned movable member in the chamber, and the latter serving to force the material into the opening in the mold plate.

and means for moving the mold plate while material is being forced into the opening therein.

11. In a molding machine, a rotary feed plate having a cylindrical chamber therein, a rotary mold plate having a portion provided with a series of openings that pass beneath the chamber, a table beneath the mold plate and in close engagement with the lower surface thereof, a rotatable shaft with which the cylindrical chamber may be brought in axial alinement, a wiper fixed to the end of the shaft, means for reciprocating the shaft to project the wiper into the chamber, a presser foot adapted to enter the chamber behind the wiper to feed material to the latter, which in turn forces it into the openings in the mold plate.

12. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, and means for rotating the mold plate while the wiper is rotating in the chamber.

13. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, a feeding mechanism adapted to enter the chamber behind the wiper to feed material thereto, and means for rotating the mold plate while the wiper is rotating in the chamber.

14. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, and means for intermittently rotating the mold plate, said rotation taking place while said wiper is inserted within the chamber.

15. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, a presser foot movable longitudinally in respect to the shaft and adapted to enter the chamber behind the wiper to feed material thereto, and means for intermittently rotating the mold plate, said rotation taking place while the wiper is inserted within the chamber.

16. In a molding machine, a rotary feed plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, and means for rotating the mold plate while the wiper is rotating in the chamber.

17. In a molding machine, a rotary feed plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, means for rotating the mold plate while the wiper is rotating in the chamber, means for holding the mold plate stationary at other times, and means for removing molded material from the openings therein while the mold plate is held stationary.

18. In a molding machine, a rotary feed plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, means for rotating the mold plate while the wiper is rotating in the chamber, means for holding the mold plate stationary at other times, vertically reciprocating punches adapted to force molded material from the openings in the mold plate while the latter is held stationary, and means for thereafter removing the molded material from beneath the mold plate.

19. In a molding machine, a hopper having an opening in the bottom thereof, a rotary feed plate, the upper face of which is in proximity to the opening in the hopper, the feed plate having a series of openings therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, and means for rotating the mold plate while the wiper is rotating in the chamber.

20. In a molding machine, a feed plate having a series of chambers therein, means for intermittently rotating the feed plate, means for holding the feed plate stationary at other times, a rotating shaft with which the chambers successively come into axial alinement, a wiper on the shaft, means for reciprocating the shaft to cause the wiper to enter the chamber that is in alinement therewith, an annular pressure foot slidably mounted on the wiper and arranged to enter the chamber behind the wiper and feed material thereto, and a weight connected thereto for determining the pressure that the presser foot may apply to the material.

21. In a molding machine, a rotary feed plate having a chamber therein, a movable mold plate having a portion provided with a series of openings that pass beneath the chamber, a table beneath the mold plate and in close engagement with the lower surface thereof, a rotary member, and means for changing the relative location of the rotary member and the mold plate to cause the rotary member to force material into the openings in the mold plate.

22. In a molding machine, a movable feed plate having a chamber therein, a mold plate beneath the feed plate and having a series of openings therein, a table in close engagement with the lower surface of the mold plate, and a rotary reciprocating member adapted to enter the chamber in the feed plate to force material into the openings in the mold plate.

23. In a molding machine, a movable feed plate having a chamber therein, a rotary mold plate beneath the feed plate and having a series of openings therein, a table in close engagement with the lower surface of the mold plate, a rotary member, and means for moving the rotary member into the chamber in the feed plate and to and from the upper surface of the mold plate, said rotary member being adapted to force material into the openings in the mold plate.

24. In a tablet molding machine, a mold plate, means for supplying tablet material in a measured quantity upon the mold plate, reciprocating means for compressing said material upon the mold plate, and means in respect to which said reciprocating means is movable for agitating the material while under pressure.

25. In a tablet molding machine, a mold and means for moving the mold plate while material is being forced into the opening therein.

11. In a molding machine, a rotary feed plate having a cylindrical chamber therein, a rotary mold plate having a portion provided with a series of openings that pass beneath the chamber, a table beneath the mold plate and in close engagement with the lower surface thereof, a rotatable shaft with which the cylindrical chamber may be brought in axial alinement, a wiper fixed to the end of the shaft, means for reciprocating the shaft to project the wiper into the chamber, a presser foot adapted to enter the chamber behind the wiper to feed material to the latter, which in turn forces it into the openings in the mold plate.

12. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, and means for rotating the mold plate while the wiper is rotating in the chamber.

13. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, a feeding mechanism adapted to enter the chamber behind the wiper to feed material thereto, and means for rotating the mold plate while the wiper is rotating in the chamber.

14. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, and means for intermittently rotating the mold plate, said rotation taking place while said wiper is inserted within the chamber.

15. In a molding machine, a rotary feed plate having a cylindrical chamber therein, means for intermittently rotating the feed plate, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during the period between two of the steps of its intermittent movement, a wiper fixed to the shaft, means for reciprocating the shaft to project the wiper into the chamber while the latter is in axial alinement with the shaft, a presser foot movable longitudinally in respect to the shaft and adapted to enter the chamber behind the wiper to feed material thereto, and means for intermittently rotating the mold plate, said rotation taking place while the wiper is inserted within the chamber.

16. In a molding machine, a rotary feed plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, and means for rotating the mold plate while the wiper is rotating in the chamber.

17. In a molding machine, a rotary feed plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, means for rotating the mold plate while the wiper is rotating in the chamber, means for holding the mold plate stationary at other times, and means for removing molded material from the openings therein while the mold plate is held stationary.

18. In a molding machine, a rotary feed
20 plate having a cylindrical chamber therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, means for rotating the mold plate while the wiper is rotating in the chamber, means for holding the mold plate stationary at other times, vertically reciprocating punches adapted to force molded material from the openings in the mold plate while the latter is held stationary, and means for thereafter removing the molded material from beneath the mold plate.

19. In a molding machine, a hopper having an opening in the bottom thereof, a rotary feed plate, the upper face of which is in proximity to the opening in the hopper, the feed plate having a series of openings therein, means for intermittently rotating the feed plate, means for holding the plate stationary at the close of each step in its rotation, a rotary mold plate having a portion that passes beneath the chamber and said portion having a series of openings extending through it, a table beneath the mold plate and in close engagement with the lower surface thereof, a rotatable shaft with which the cylindrical chamber is brought into axial alinement during one of the periods that the feed plate is held stationary, means for rotating the shaft, a wiper fixed to the shaft, means for reciprocating said shaft to project the wiper into the chamber while the chamber is in alinement with the shaft, an annular presser foot slidably mounted on the wiper, a weight for projecting the presser foot into the chamber behind the wiper to feed material thereto, and means for rotating the mold plate while the wiper is rotating in the chamber.

20. In a molding machine, a feed plate having a series of chambers therein, means for intermittently rotating the feed plate, means for holding the feed plate stationary at other times, a rotating shaft with which the chambers successively come into axial alinement, a wiper on the shaft, means for reciprocating the shaft to cause the wiper to enter the chamber that is in alinement therewith, an annular pressure foot slidably mounted on the wiper and arranged to enter the chamber behind the wiper and feed material thereto, and a weight connected thereto for determining the pressure that the presser foot may apply to the material.

21. In a molding machine, a rotary feed plate having a chamber therein, a movable mold plate having a portion provided with a series of openings that pass beneath the chamber, a table beneath the mold plate and in close engagement with the lower surface thereof, a rotary member, and means for changing the relative location of the rotary member and the mold plate to cause the rotary member to force material into the openings in the mold plate.

22. In a molding machine, a movable feed plate having a chamber therein, a mold plate beneath the feed plate and having a series of openings therein, a table in close engagement with the lower surface of the mold plate, and a rotary reciprocating member adapted to enter the chamber in the feed plate to force material into the openings in the mold plate.

23. In a molding machine, a movable feed plate having a chamber therein, a rotary mold plate beneath the feed plate and having a series of openings therein, a table in close engagement with the lower surface of the mold plate, a rotary member, and means for moving the rotary member into the chamber in the feed plate and to and from the upper surface of the mold plate, said rotary member being adapted to force material into the openings in the mold plate.

24. In a tablet molding machine, a mold plate, means for supplying tablet material in a measured quantity upon the mold plate, reciprocating means for compressing said material upon the mold plate, and means in respect to which said reciprocating means is movable for agitating the material while under pressure.

25. In a tablet molding machine, a mold 1 plate, means for supplying tablet material in a measured quantity upon the mold plate, reciprocating means for compressing said material upon the mold plate, rotary means for agitating the material while under pressure, and means in respect to which said reciprocating means is movable for removing the tablets from the mold plate.

26. In a tablet molding machine, a mold plate, means for supplying tablet material in measured quantity upon a mold plate, reciprocating means for compressing said material upon the mold plate, and rotary means in respect to which said reciprocating means is movable for agitating the material while under pressure.

In testimony whereof we have signed this specification in the presence of two subscribing witnesses.

ARTHUR COLTON.
BURTON W. SCOTT.

Witnesses:
  T. F. ROELLINGER,
  EDWARD N. PAGELSEN.